No. 691,443. Patented Jan. 21, 1902.
O. H. CASTLE.
SUCTION VALVE.
(Application filed Jan. 4, 1901.)
(No Model.)
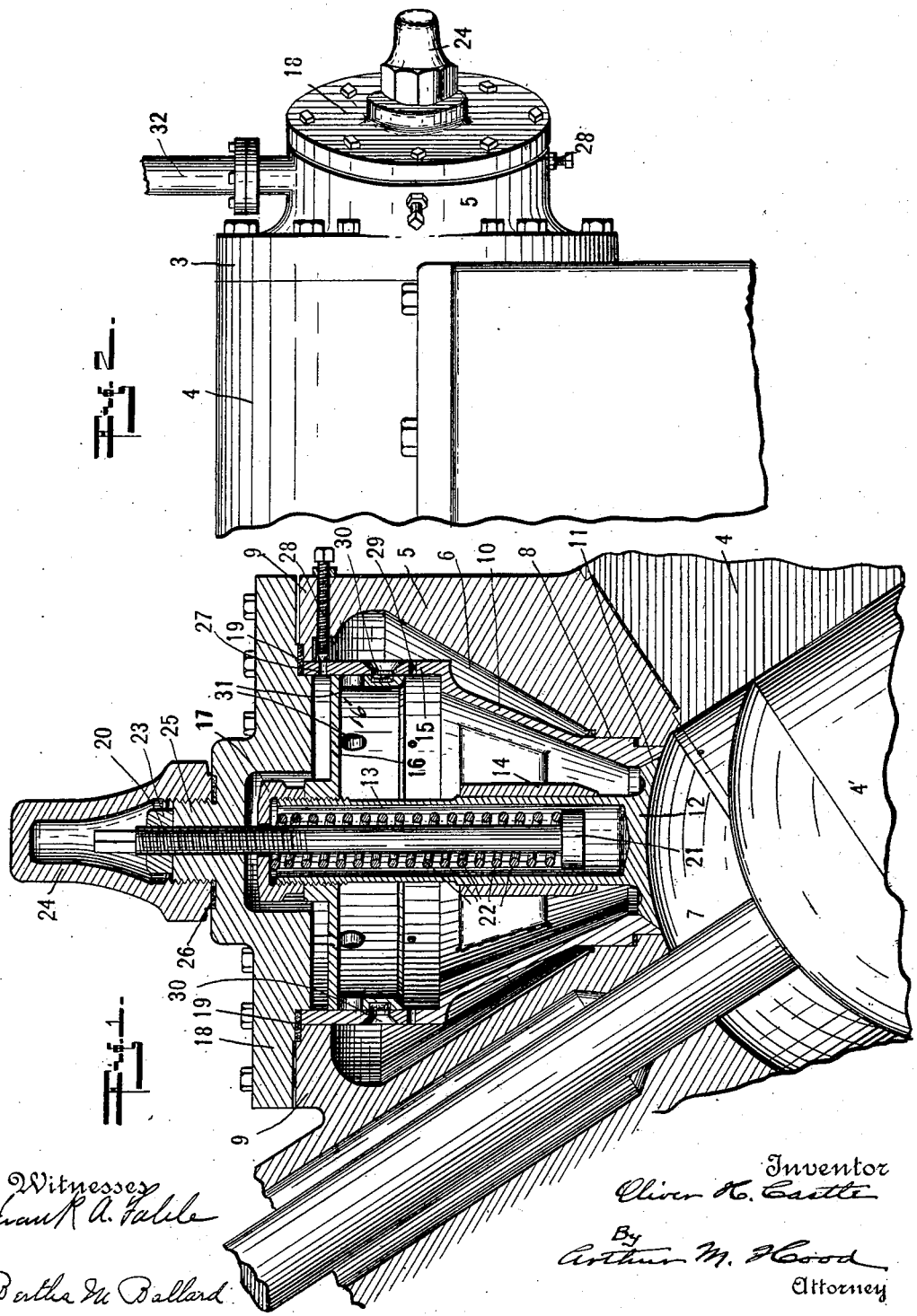
Witnesses
Frank A. Faber
Bertha M. Ballard
Inventor
Oliver H. Castle
By Arthur M. Hood
Attorney

UNITED STATES PATENT OFFICE.

OLIVER H. CASTLE, OF INDIANAPOLIS, INDIANA.

SUCTION-VALVE.

SPECIFICATION forming part of Letters Patent No. 691,443, dated January 21, 1902.

Application filed January 4, 1901. Serial No. 41,822. (No model.)

*To all whom it may concern:*

Be it known that I, OLIVER H. CASTLE, a citizen of the United States, residing at Indianapolis, in the county of Marion and State of Indiana, have invented a new and useful Suction-Valve, of which the following is a specification.

My invention relates to an improvement in inlet-valves for compressors.

The objects of my invention are to produce a suction-valve particularly designed for use in ammonia-compressors, to arrange the parts for easy adjustment without leakage during the operation of the compressor, and to reduce the intermediate action of the valve-spring, so as to decrease the final charging-vacuum.

The accompanying drawings illustrate my invention.

Figure 1 is a central section of my improved valve, the casing being formed integral with the head of a cylinder. Fig. 2 is an elevation.

In the drawings, 3 indicates the removable head of a cylinder 4. Formed integral with head 3 is a boss or enlargement 5, within which is formed a conical chamber 6, the smaller end of which extends through the head into a recess 7, which forms a continuation of the bore of cylinder 4. Formed at the inner end of chamber 6 is a circular seat 8 and at the outer end a larger circular seat 9. Mounted within chamber 6 is a shell 10, which at its lower end fits within seat 8 and at its upper end fits within seat 9, forming gas-tight joints with both seats. Formed in the lower end of shell 10 is a valve-seat 11, within which fits a valve 12, said valve opening from shell 10. Valve 12 is provided with a hollow stem 13, which is supported within a bearing 14, supported by a suitable spider within shell 10. The upper end of shell 10 is formed into a cylinder 15, which is considerably larger in diameter than seat 11. Mounted in cylinder 15 is a piston 16, which is adjustably secured to the upper end of stem 13 by a threaded connection and a nut 17. Chamber 6 is closed by shell 10, and the upper end of said shell is closed by a head 18, between which and the upper end of the shell is placed suitable packing 19. Threaded through the center of head 18 and extending down into the interior of stem 13 is a bolt 20, provided at its lower end with an enlarged head 21. Mounted between head 21 and nut 17, so as to normally urge valve 12, together with the attached piston 16, upward, is a spring 22. Bolt 20 is held in any desired position by means of a check-nut 23, and the outer end of said bolt, together with the check-nut, is inclosed by a cap 24, which is threaded upon a boss 25, formed integral with head 18, a packing 26 being placed between said cap and head to insure a tight joint. Leading from chamber 6 into the interior of shell 10 above piston 16 is a series of openings 27, the available area of each of which may be adjusted by means of valve 28. Leading from chamber 6 into the interior of shell 10 below piston 16 is a series of openings 29, and leading into said shell from the same chamber between openings 27 and 29 is a series of openings 30. Piston 16 is provided with an annular flange 16', through which extends a series of openings 31, which may be brought into register with openings 30. The axis of the valve is placed at an angle to the axis of cylinder 4 in order that the valve 12 may be given as great an area as possible without decreasing the proportion between said valve and the piston 16.

In operation valve 12 is normally held into its seat 11 by means of spring 22, piston 16 of the valve lying in the outer end of cylinder 15 and openings 31 being entirely out of register with openings 30. The supply-pipe 32 leads into chamber 6 at any desired point, and the ammonia passes through openings 27 and 29, thus filling shell 10 upon both sides of piston 16 with gas at the supply-pressure and balancing the valve. As soon as the piston 4' in cylinder 4 moves away from the valve the first action is a removal of pressure from the inside of valve 12, which allows the external pressure to overcome the spring 22 and force said valve from its seat. Immediately the gas from the lower interior of shell 10 is drawn out, and the external pressure acts upon the increased area of the piston 16. This action results in a further opening of valve 12 and brings openings 31 into register with openings 30. The gas passes thereafter through said openings 30 and 31 and through shell 10 into the cylinder 4. The valve will remain open until the suction on piston 16 is counterbalanced by spring 22, the vacuum required being considerably less than that which would be required to hold the valve open if the action were upon the smaller area of valve 12 alone. As soon as the vacuum is reduced to the point of release the valve is returned to its initial position by means of spring 22. If it is desired to adjust the tension of spring 22, cap 24 is removed and bolt 20 adjusted to the desired point, there being practically no leakage around bolt 25 through head 18.

I claim as my invention—

1. A suction-valve structure, consisting of a casing, a valve mounted therein, a piston of greater area than the valve carried thereby and fitting in the casing, a supply-inlet leading into the casing between the piston and valve, and a supply-inlet leading into the casing beyond the piston.

2. A suction-valve structure, consisting of a casing, a valve mounted therein, a piston of greater area than the valve carried thereby and fitting into the casing, means for yieldingly holding said valve closed, a supply-inlet leading into the casing between the piston and valve, and a supply-inlet leading into the casing beyond the piston.

3. A suction-valve structure, consisting of a casing, a valve mounted therein, a piston of greater area than the valve, carried thereby and fitting in the casing, a supply-inlet leading into the casing between the piston and valve, means carried by said piston for normally closing said inlet, means for yieldingly holding the valve closed, and a supply-inlet leading into the casing beyond the piston.

4. A suction-valve structure, consisting of a supply-chamber, a shell mounted therein, a valve-seat formed at the inner end of said shell, a cylinder of greater diameter than the valve-seat formed in the outer end of said shell, a valve arranged to coöperate with the seat, a piston mounted in the cylinder and carried by the valve, a supply-inlet leading from the chamber into the shell between the valve and piston, and a supply-inlet leading into the cylinder beyond the piston.

5. A suction-valve structure, consisting of a supply-chamber, a shell mounted therein, a valve-seat formed at the inner end of said shell, a cylinder of greater diameter than the valve-seat formed in the outer end of the shell, a valve arranged to coöperate with said seat, a piston mounted in the cylinder and carried by said valve, a supply-inlet leading from the chamber into the shell between the valve and piston, means carried by the piston for normally closing the supply-inlet, and a supply-inlet leading into the cylinder from beyond the piston.

6. A suction-valve structure consisting of a chamber, a shell mounted therein, a valve-seat formed at the inner end of said shell, a cylinder of greater diameter than the valve-seat formed in the outer end of said shell, a valve arranged to coöperate with the valve-seat, a piston carried by the valve and fitting in said cylinder, the supply-inlet leading into the cylinder beyond the piston, a head closing the outer end of the shell, a bolt adjustably mounted in said head and extending into said shell, a spring mounted between said bolt and valve so as to normally close the valve, and a cap covering the outer end of said bolt.

7. A suction-valve structure consisting of a chamber, a shell mounted therein, a valve-seat formed at the inner end of said shell, a cylinder of greater diameter than the valve-seat formed in the outer end of said shell, a valve arranged to coöperate with the valve-seat, a piston mounted in said cylinder and secured to the valve, a supply-inlet leading into said cylinder, means carried by the piston for normally closing said supply-inlet, smaller inlets leading into said shell upon each side of the piston, and means for yieldingly holding the valve to its seat.

8. A suction-valve structure consisting of a chamber, a shell mounted therein, a valve-seat formed at the inner end of said shell, a cylinder of greater diameter than the valve-seat formed in the outer end of said shell, a valve arranged to coöperate with the valve-seat, a hollow stem carried by said valve, a piston mounted in said cylinder and secured to said stem, a supply-inlet leading into the shell between the valve and piston, a passage leading from the chamber into the outer end of the cylinder, means carried by the piston for normally closing said inlet, a head closing the cylinder end of the shell, a bolt adjustably mounted in said head and extending into the hollow valve-stem, and a spring for normally closing the valve mounted between said bolt and valve-stem.

9. A suction-valve structure consisting of a chamber, a shell mounted therein, a valve-seat formed at the inner end of said shell, a cylinder of greater diameter than the valve-seat formed in the outer end of said shell, a valve arranged to coöperate with the valve-seat, a hollow stem carried by said valve, a piston mounted in said cylinder and carried by said stem, a supply-inlet leading into the shell between the valve and piston, a passage leading from the chamber into the outer end of the cylinder, means carried by the piston for normally closing said inlet, a head closing the cylinder end of the shell, a bolt adjustably mounted in said head and extending into the hollow valve-stem, a spring for normally closing the valve mounted between said bolt and valve-stem, and a cap covering the outer end of said bolt.

OLIVER H. CASTLE.

Witnesses:
ARTHUR M. HOOD,
BERTHA M. BALLARD.